(12) United States Patent
Krishnan et al.

(10) Patent No.: US 7,757,094 B2
(45) Date of Patent: Jul. 13, 2010

(54) POWER MANAGEMENT FOR SUBSCRIBER IDENTITY MODULE

(75) Inventors: Chidambaram Krishnan, San Diego, CA (US); James A. Hutchison, IV, San Diego, CA (US); Tom Summers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2240 days.

(21) Appl. No.: 09/867,363

(22) Filed: May 29, 2001

(65) Prior Publication Data

US 2002/0120852 A1 Aug. 29, 2002

Related U.S. Application Data

(60) Provisional application No. 60/271,789, filed on Feb. 27, 2001.

(51) Int. Cl.
*G06F 21/00* (2006.01)
*G06F 1/00* (2006.01)
*G06F 7/04* (2006.01)
*G06F 1/26* (2006.01)

(52) U.S. Cl. ............... 713/185; 713/300; 713/310; 713/322; 713/324; 726/9; 726/34; 726/36

(58) Field of Classification Search ........... 713/185, 713/200, 300, 310, 322, 324; 726/9, 34, 726/36
See application file for complete search history.

(56) References Cited

U.S. PATENT DOCUMENTS 5,103,459 A 4/1992 Gilhousen et al.

(Continued)

FOREIGN PATENT DOCUMENTS

EP 0607767 A1 * 7/1994

(Continued)

OTHER PUBLICATIONS

Yasukawa, H. "Spectrum Broadening of Telephone Band Signals Using Multirate Processing for Speech Quality Enhancement" IEICE Transactions on Fundamentals of Electronics, Communications and Computer Sciences, Institute of Electronics Information and Comm. Eng. Tokyo, JP., vol. E78-A:8. pp. 996-998 (1995).

(Continued)

*Primary Examiner*—Aravind K Moorthy
(74) *Attorney, Agent, or Firm*—George C. Pappas; Eric Ho

(57) ABSTRACT

A power management technique for a Subscriber Identity Module (SIM), makes use of a voting process to determine when to power-up and power-down the SIM. In particular, the voting process determines whether software modules running on a wireless communication device (WCD) require current or imminent access to the SIM. The voting process is designed to make more efficient use of the SIM without sacrificing performance. A modified security authorization process can be added, in which the WCD caches a user access code in memory for authenticating the user to the SIM to gain access to the secure features of the SIM. The security verification process avoids the need for the user to enter the access code each time the SIM is powered up in the course of the power management routine, reducing user inconvenience and maintaining performance.

99 Claims, 6 Drawing Sheets

U.S. PATENT DOCUMENTS

| | | | | |
|---|---|---|---|---|
| 5,361,392 | A * | 11/1994 | Fourcroy et al. | 713/310 |
| 5,537,474 | A | 7/1996 | Brown et al. | |
| 5,680,626 | A * | 10/1997 | Chu et al. | 713/322 |
| 5,898,783 | A * | 4/1999 | Rohrbach | 340/5.31 |
| 5,987,614 | A | 11/1999 | Mitchell et al. | |
| 6,014,748 | A | 1/2000 | Tushie et al. | |
| 6,044,069 | A * | 3/2000 | Wan | 370/311 |
| 6,092,209 | A * | 7/2000 | Holzhammer et al. | 713/324 |
| 6,094,573 | A | 7/2000 | Heinonen et al. | |
| 6,094,700 | A * | 7/2000 | Deschepper et al. | 710/313 |
| 6,115,823 | A | 9/2000 | Velasco et al. | |
| 6,124,799 | A | 9/2000 | Parker | |
| 6,125,283 | A * | 9/2000 | Kolev et al. | 455/552.1 |
| 6,138,005 | A | 10/2000 | Park | |
| 6,282,614 | B1 | 8/2001 | Musoll | |
| 6,366,777 | B1 | 4/2002 | Uusitalo | |
| 6,369,710 | B1 | 4/2002 | Poticny et al. | |
| 6,381,477 | B1 * | 4/2002 | Johnson et al. | 455/572 |
| 6,461,193 | B1 * | 10/2002 | Matthies | 439/509 |
| 6,466,781 | B1 | 10/2002 | Bromba et al. | |
| 6,480,725 | B2 * | 11/2002 | Cassidy et al. | 455/558 |
| 6,484,022 | B1 | 11/2002 | Findikli et al. | |
| 6,487,425 | B1 * | 11/2002 | Thakker et al. | 455/574 |
| 6,587,691 | B1 * | 7/2003 | Granstam et al. | 455/457 |
| 6,595,414 | B1 * | 7/2003 | Eber et al. | 235/380 |
| 6,658,578 | B1 * | 12/2003 | Laurenti et al. | 713/324 |
| 6,662,023 | B1 | 12/2003 | Helle | |
| 6,678,508 | B1 * | 1/2004 | Koilpillai et al. | 455/137 |
| 6,680,920 | B1 | 1/2004 | Wan | |
| 6,696,919 | B1 * | 2/2004 | Leickel et al. | 340/5.74 |
| 6,741,848 | B2 * | 5/2004 | Timonen et al. | 455/405 |
| 6,763,249 | B2 * | 7/2004 | Shirai | 455/558 |
| 6,807,595 | B2 * | 10/2004 | Khan et al. | 710/260 |
| 2003/0066881 | A1 * | 4/2003 | Maenpaa et al. | 235/380 |
| 2006/0010340 | A1 * | 1/2006 | Makela et al. | 714/5 |
| 2006/0155913 | A1 * | 7/2006 | Nishikawa et al. | 711/100 |
| 2008/0089162 | A1 | 4/2008 | Makela et al. | 365/228 |
| 2009/0200368 | A1 * | 8/2009 | Kim et al. | 235/375 |
| 2009/0291712 | A1 * | 11/2009 | Park et al. | 455/558 |

FOREIGN PATENT DOCUMENTS

| | | |
|---|---|---|
| EP | 0657873 | 12/1994 |
| EP | 0822730 | 2/1998 |

OTHER PUBLICATIONS

Sim, et al., Characteristics of closed loop power control algorithms for cellular DS/CDMA system, 1998, IEEE, pp. 355-362.

Sim, et al., Characteristics of closed loop power control algorithms for cellular CDMA system, 199, IEEE, pp. 911-921.

Anonymous, Power Solutions for GSM handsets, 2000, Wireless Design & Development, p. 18.

Niiranen, Kassu, Highly integrated, system-level GPRS solution, 2002, Wireless Design & Development, pp. 20-22.

* cited by examiner

POWER MANAGEMENT FOR SUBSCRIBER IDENTITY MODULE

CROSS-REFERENCE TO RELATED APPLICATIONS

This application claims the benefit of U.S. Provisional Application Ser. No. 60/271,789, filed Feb. 27, 2001, the content of which is incorporated herein by reference in its entirety.

FIELD OF THE INVENTION

The invention relates generally to wireless communication devices and, more particularly, to wireless communication devices that include a Subscriber Identity Module (SIM).

BACKGROUND OF THE INVENTION

A Subscriber Identity Module (SIM), such as a Removable User Identity Module (R-UIM), Universal Subscriber Identity Module (USIM), or GSM SIM, contains information relating to a user of a wireless communication device (WCD). A typical WCD may take the form of a cellular radiotelephone, satellite radiotelephone, a PCMCIA card incorporated within a computer, a PDA equipped with wireless communication capabilities, and the like.

A SIM typically includes a controller and memory housed in a card-like structure. The memory may contain user information including, for example, a subscriber/user identifier, a phonebook providing a stored bank of telephone numbers, messages, billing codes, encryption sequences for secure wireless data communication, and other useful information that can be retrieved during use. The memory also may store applications that are accessed by the WCD, e.g., for over-the-air service provisioning, cryptography, web browsing, or mobile commerce.

Typically, a SIM is removable, enabling a user to install the SIM in, or remove the SIM from, a WCD. The SIM can be removed from a first WCD, for example, and installed in a second WCD. In this manner, the SIM enables the user to transfer user information from one WCD to another WCD. This can be especially useful when the user travels to regions supported by different wireless protocols, which may require the use of a different WCD.

A SIM includes a relatively simple electrical interface, including an input/output (I/O) port for exchanging serial data with another device such as a WCD, a clock input for receiving an external clock signal, and a reset input for receiving a reset signal. A SIM ordinarily receives power from the device in which it is installed.

A WCD typically is powered by a rechargeable power source such as a Lithium Ion battery. Power consumption by the SIM can be a significant factor in overall WCD power consumption. A SIM consumes battery reserves and can reduce standby time for the WCD. Accordingly, efficient management of power consumption by a SIM is highly desirable.

SUMMARY OF THE INVENTION

The invention is directed to power management techniques for a Subscriber Identity Module (SIM), such as a Removable User Identity Module (R-UIM), Universal Subscriber Identity Module (USIM), or GSM SIM. The invention is particularly useful for a SIM used with a wireless communication device (WCD).

The invention makes use of a voting process to determine when to power-up and power-down the SIM to support activities that require continuity of power. In particular, the voting process determines whether software modules running on the WCD require current or imminent access to the SIM before powering down the SIM. The voting process is designed to make more efficient use of the SIM with minimal or no impact on performance. In this manner, the invention is capable of reducing power consumption by a SIM, and thereby increasing battery duration and standby time for a WCD in which the SIM is installed.

The invention may also involve caching, in memory associated with the WCD, an access code for uniquely identifying a SIM user. With an R-UIM, for example, the access code may be a card holder verification (CHV) code. For a USIM, the access code may be a personal identification number (PIN). Unlike conventional systems in which a user keys the access code into the WCD each time the WCD, and hence the SIM, is powered-up, the WCD retrieves the cached access code from memory when the SIM is powered-up following a power-down initiated by a power management process. In this manner, the SIM can be powered up and down according to the voting process without requiring the user to repeatedly enter the access code, thereby reducing user inconvenience and maintaining WCD performance.

In one embodiment, the invention provides a system for controlling power to a SIM in a WCD. The system may comprise a power source coupled to the SIM, and a processor within the WCD that controls the power source. In particular, the processor may supply power from the power source to the SIN when a request from the WCD is pending for service by the SIM, or when a software module running on the WCD requests maintenance of power to the SIM. In addition, the processor may control termination of power to the SIM when no request from the WCD is pending for service by the SIM and no software module running on the WCD requests supply of power to the SIM.

In another embodiment, the invention provides a method for controlling power to a SIM in a WCD. The method may comprise supplying power to the SIM when a request from the WCD is pending for service by the SIM. In addition, the method includes supplying power to the SIM when a software module running on the WCD requests maintenance of power to the SIM. The method also may comprise terminating power to the SIM when no request from the WCD is pending for service by the SIM, and no software module running on the WCD requests the supply of power to the SIM. A computer-readable medium that carries instructions for performing such a method is also contemplated.

In an added embodiment, the invention provides a method comprising storing a user access code associated with a SIM in a memory associated with a WCD, retrieving the user access code from the memory when power is resupplied to the SIM, and using the retrieved user access code in a security authorization process to authorize use of secure features of the SIM by the WCD. A computer-readable medium that carries instructions for performing such a method is also contemplated.

In a further embodiment, the invention provides a system comprising a memory that stores a user access code associated with a SIM in a memory associated with a WCD, and a processor that retrieves the user access code from the memory when power is resupplied to the SIM. The processor uses the retrieved user access code in a security authorization process to authorize use of secure features of the SIM by the WCD.

The invention is capable of providing a number of advantages. For example, the use of a voting process to determine when to power-up and power-down the SIM permits conservation of power without undermining SIM performance. In particular, before powering down the SIM, the voting process verifies that there are no pending requests and that no WCD software modules anticipate imminent generation of a request to be served by the SIM. In addition, caching the access code in the WCD relieves the user from the need to enter the information each time the SIM is powered-up for use in the course of power management. Thus, when the user powers the WCD up and down in normal operation, the user enters the access code. When power management results in powering down of the SIM, however, the WCD attends to retrieval of the access code from memory and sends it to the SIM for use by the SIM processor in authentication of the user.

The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
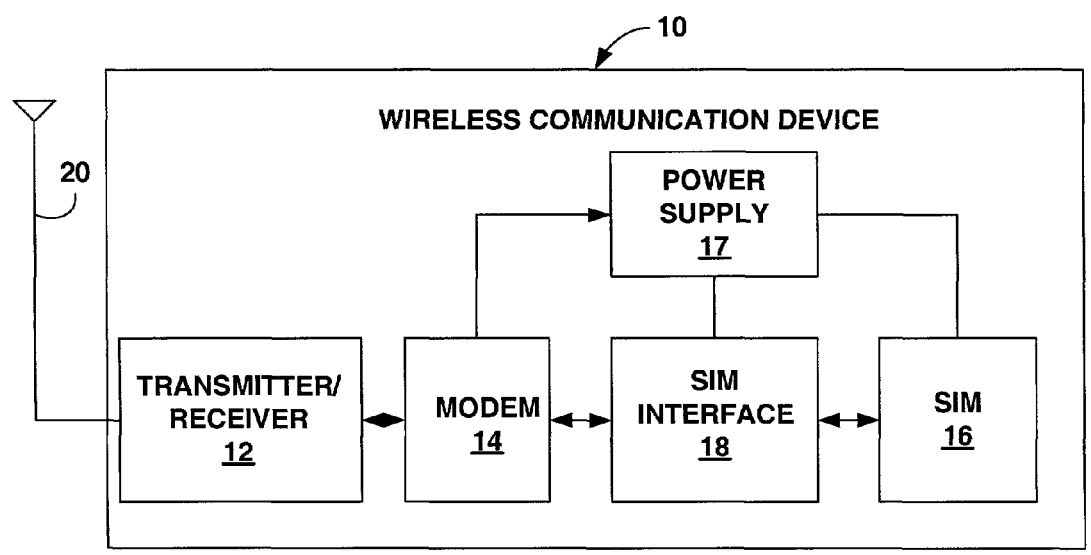
FIG. 1 is a block diagram illustrating a WCD that incorporates a SIM.

FIG. 1 is a block diagram illustrating an example wireless communication device (WCD) 10 that incorporates a subscriber identity module (SIM) 16. As shown in FIG. 1, WCD 10 may include, in addition to SIM 16, a radio frequency transmitter/receiver 12, a modem 14, a SIM interface 18, and a radio frequency antenna 20. FIG. 1 also shows a power supply 17 that may provide power to SIM 16 and SIM interface 18. Modem 14 may be configured to control power supply 17 to selectively deliver power to SIM 16, SIM interface 18, or both. Non-limiting examples of WCD 10 include a cellular radiotelephone, satellite radiotelephone, a PCMCIA card incorporated within a computer, a PDA equipped with wireless communication capabilities, and the like.

WCD 10 may emit signals via antenna 20 that conform to any number of communication protocols including, for example, a Code Division Multiple Access (CDMA), WCDMA or GSM protocol. Modem 14 includes demodulator/decoder circuitry and encoder/modulator circuitry, both of which are coupled to transmitter/receiver 12 to transmit and receive communication signals. SIM interface 18 includes circuitry that drives communication between modem 14 and SIM 16.

SIM 16 may take the form of a conventional SIM card based on ISO/IEC 7816 that can be installed in and removed from WCD 10. SIM 16 may be, for example, a Removable User Identity Module (R-UIM), Universal Subscriber Identity Module (USIM), or GSM SIM. SIM 16 may conform to any of the following SIM standards: TIA/EIA IS-820, ETSI TS 100 977 and ETSI TS 102 221. In addition, SIM 16 may conform to other standards that emerge in the future for SIM cards and other similar devices for carrying user information. Memory contained in SIM 16 may store a variety of information including subscriber/user identification, telephone numbers, messages, billing codes, encryption sequences, and the like, as well as applications accessed by WCD 10. WCD 10 accesses SIM 16 via SIM interface 18 to retrieve selected information as needed in the course of wireless communication.

As an illustration, when a user first powers up WCD 10, the WCD may access SIM 16 to retrieve subscriber/user identification information such as an access code for use in an optional security authorization process carried out by the SIM. In particular, a CPU or other control logic, generally referred to herein as a processor, associated with SIM 16 may compare the subscriber/user identification to an access code, e.g., a series of numbers, entered into WCD 10 by the user via a keypad or other input device.

If the access code entered by the user is valid for SIM 16, the secure features of the SIM are activated for use by WCD 10. If not, the secure features of SIM 16 are locked and cannot be used. Specifically, the secure features of SIM 16 may remain locked until the SIM receives a valid access code from the user via WCD 10. The optional security authorization process is intended to verify that WCD 10 is in the possession of an authorized user, and repeats each time WCD powers up SIM 16. WCD 10 may retrieve other information from SIM 16, such as billing codes for use in cost accounting. In addition, WCD 10 may retrieve encryption sequences generated by or stored in SIM 16 to support more secure data or voice communication and access secure applications.

In accordance with the invention, WCD 10 performs a power management routine to conserve battery resources and extend standby time. In particular, WCD 10 performs a voting process to determine when to power-up and power-down SIM 16. The voting process is designed to make more efficient use of SIM 16 without sacrificing performance, and may be implemented in modem 14 to control power supply 17. For example, before powering down SIM 16, the voting process may be designed to evaluate present requirements of software modules running on the WCD 10 for access to SIM 16. A software module may take the form of a thread, interrupt service routine, device driver, assembly routine, state transition, or the like that executes within an operating environment on the WCD 10 under the control of a CPU or other control logic.

If a software module running on WCD 10 has generated a command or request, or is otherwise performing some action that requires service by SIM 16, the SIM is not powered down. In addition, if a software module running on WCD 10 votes against powering down SIM 16, the SIM is not powered down. In this case, a software module on WCD 10 may anticipate the imminent need for service by SIM 16. Thus, to power down SIM 16, the power management routine determines that there are no pending commands and that no software module has voted against powering down SIM 16. In this manner, WCD 10 can efficiently manage power to SIM 16 to increase battery duration and standby time while minimizing adverse effects on performance.

WCD 10 also may be configured to cache particular information useful in the optional security authorization process to enhance user convenience. In particular, in conjunction with the power management routine, WCD 10 may cache an access code in memory associated with the WCD when a SIM power-down/power-up cycle is invoked. This added feature promotes user convenience by eliminating the need to reenter the access code when both the security authorization process and the power management routine are active. Instead, the cached access code can be used to complete the security authorization process in a seamless manner that is transparent to the user, without the need to substantially alter the security authorization process itself.

When SIM 16 powers up following a power-down invoked by the power management routine, WCD 10 retrieves the access code from the WCD memory, if the access code was cached, and sends it to the SIM for authentication of the user. SIM 16 completes the security authorization process by authenticating the cached access code and thereby maintains the WCD in an active, operative state for the user. In this manner, each time SIM 16 is powered down for purposes of the power management routine, WCD 10 and SIM 16 together carry out the security authorization process without requiring the user to enter the access code into the WCD, e.g., via the keypad. When the user purposely powers down WCD 10, however, the user is forced to enter the access code when the security authorization process is active. In that case, WCD 10 does not cache the access code. Thus, the power management routine can achieve improved power efficiency without the need to substantially modify the security authorization process.

Figure 2:
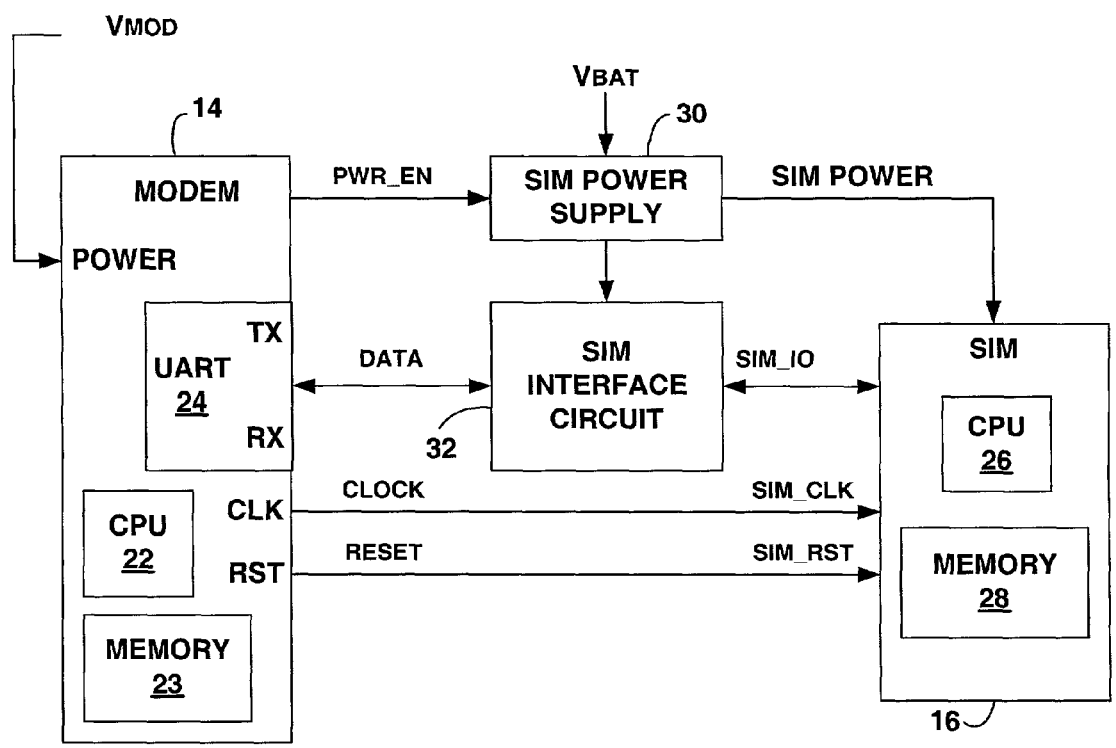
FIG. 2 is a block diagram illustrating a power management system for a WCD that incorporates a SIM.

FIG. 2 is a block diagram illustrating an exemplary power management system for a WCD 10 that incorporates SIM 16. As shown in FIG. 2, modem 14 may incorporate a central processing unit (CPU) 22 or other control logic, generally referred to herein as a processor or CPU, and a universal asynchronous receiver/transmitter (UART) circuit 24. CPU 22 functions as a modem controller, and may be a 32-bit controller such as a 32-bit reduced instruction set controller (RISC) controller. Accordingly, the data I/O bus associated with UART circuit 24 may be a 32-bit bus.

Modem 14 also may include a memory 23 that contains instructions for execution by CPU 22, and provides storage space for information stored by the CPU of other components. In addition, modem 14 may include an I/O port for communication with SIM 16. For example, modem 14 may include a data I/O port by which a transmitter and receiver in UART circuit 24 respectively transmit data to and receive data from SIM 16 under control of CPU 22. In the example of FIG. 2, modem 14 also includes clock and reset output ports (CLK and RST) that transmit clock and reset signals to SIM 16 to drive synchronous communication between the modem and SIN.

Modem 14 can selectively enable and disable the clock signal SIM_CLK to control SIM 16. The reset signal SIM_RST can be used to reset SIM 16, and can be selectively asserted and deasserted by modem 14. WCD 10 and, in particular, UART circuit 24 may conform substantially to that described in copending U.S. patent application Ser. No. 09/773,768, filed Feb. 2, 2001, and entitled "CIRCUIT AND METHOD FOR INTERFACING A MODEM IN A WIRELESS COMMUNICATION DEVICE TO A SUBSCRIBER INTERFACE MODULE," the entire content of which is incorporated herein by reference.

CPU 22 can be programmed to write data and commands to other components such as UART circuit 24, coupled to a data bus, and may be responsive to various interrupt signals generated by the components. CPU 22 may use, for example, memory mapped access, I/O port access, or other access techniques to interact with such components. Advantageously, CPU 22 may be used as both an SIM interface controller that controls interaction with and operation of SIM 16, and a modem controller that controls operations within modem 14 that may be unrelated to the operation of SIM.

CPU 22 may be programmed to carry out various aspects of a power management routine in accordance with the invention, as well as certain aspects of a modified security authorization process.

SIM 16 may include a CPU 26 or other control logic and memory 28 that stores a variety of user information such as subscriber/user identification, telephone numbers, messages, billing codes, encryption sequences, secure applications and the like. SIM 16 includes an I/O port that receives data (SIM_IO) transmitted by UART circuit 24, a clock input (SIM CLK), and a reset input (SIM RST). SIM power supply 30 generates power from a battery voltage VBAT associated with a battery connected to power supply 30, and applies it to SIM 16. SIM power supply 30 of FIG. 2 may correspond to power supply 17 of FIG. 1. A SIM interface circuit 32 provides driver circuitry. In particular, SIM interface circuit 32 permits modem 14 to transmit data to and receive data from SIM 16 over a common data line, indicated by UIM_10. As further shown in FIG. 2, SIM power supply 30 also may generate power for SIM interface circuit 32. Modem 14 receives a modem supply voltage VMOD from another power supply (not shown).

In the example of FIG. 2, modem 14 includes a power enable output that emits a PWR_EN signal. The PWR_EN signal controls SIM power supply 30 to either supply or terminate power from SIM power supply 30 to SIM 16 and SIM interface circuit 32. Under control of CPU 22, for example, modem 14 may deactivate SIM power supply 30 or decouple it from SIM 16 and SIM interface circuit 32, e.g., via one or more switches that decouple respective power supply lines.

When SIM power supply 30 is deactivated or decoupled, SIM 16 and SIM interface circuit 32 are powered down, and cease to consume battery resources. Power to SIM 16 alternatively may be terminated under control of CPU 22 by first terminating the clock signal applied to SIM interface circuit 32 by modem 14. In this case, however, SIM 16 and SIM interface circuit 32 may continue to consume a small amount of power until supply of power from SIM power supply 30 is terminated.

Before asserting or deasserting the PWR_EN signal to terminate power, modem 14 carries out a voting process under control of CPU 22 to manage power. As an illustration, modem 14 may continue to supply power to SIM 16 when a request from a software module running on the WCD 10 is pending for service by the SIM, or when a software module running on the WCD requests maintenance of power to the SIM. In the first case, a request is actively pending for service by SIM 16. Modem 14 may determine whether a request is pending for service by SIM 16 by inspecting a request queue associated with SIM 16. The request queue may be provided in memory carried by WCD 10, such as memory 23, and accessible by CPU 22.

In the second case, no request is pending for service by SIM 16, but a software module running on WCD 10 anticipates generation of such a request and "votes" against powering down the SIM. Modem 14 may poll one or more processes running on WCD 10 to obtain the necessary votes before powering down SIM 16. Alternatively, modem 14 may refer to voting information in the form of a data structure, such as a bit mask, that stores an indication of the votes registered by the processes. The bit mask may include, for example, bits that correspond to software modules or processes running on WCD 10. If a software module requests supply of power to SIM 16, it may assert the corresponding bit in the bit mask. If any of the bits in the bit mask is asserted, modem 14 maintains the supply of power to SIM 16.

Modem 14 terminates power to SIM 16 when no request from WCD 10 is pending for service by the SIM and no software module running on the WCD requests supply of power to the SIM. Thus, modem 14 ensures that there is no pending request and that no software module anticipates such a request before powering down SIM 16. In this manner, modem 14 is able to efficiently manage power without significantly undermining performance. Specifically, modem 14 avoids the latency caused by a power-down and power-up cycle when a request is pending or anticipated, and thus the resultant performance degradation.

Upon powering down SIM 16, modem 14 may consult the processes running on WCD 10, a request queue, or a data structure such as a bit mask, to determine whether to re-initiate supply of power. A variety of software modules running on WCD 10 may require access to, or service by, SIM 16 including, for example, processes for operation of air interfaces such as AMPS (Advanced Mobile Phone System) or CDMA that require number assignment module (NAM) information stored on the SIM, the security authorization process upon power-up of following a manual lock-out, encryption processes that require access to key information provided by the SIM, and the like.

Figure 3:
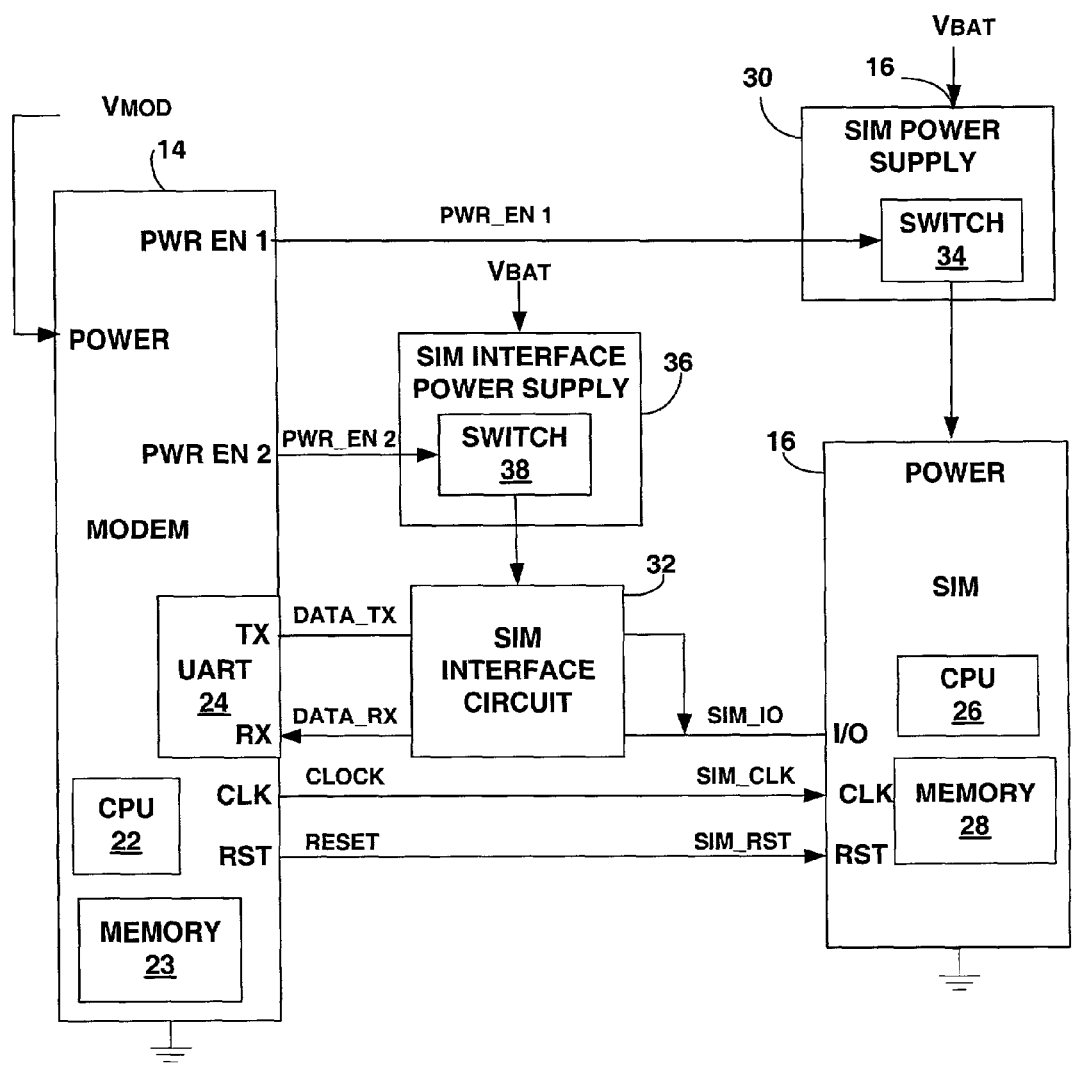
FIG. 3 is a block diagram illustrating another power management system for a WCD that incorporates a SIM.

FIG. 3 is a block diagram illustrating another power management system for a WCD 10 that incorporates a SIM 16. The system of FIG. 3 corresponds substantially to that of FIG. 2. FIG. 3 illustrates SIM interface circuit 32 in slightly greater detail, however, depicting transmitted data line DATA_TX and received data line DATA_RX coupled to UART circuit 24. Also, in the example of FIG. 3, SIM 16 and SIM interface circuit 32 have separate power supplies. In particular, SIM 16 receives power from SIM power supply 30, whereas SIM interface circuit 32 receives power from SIM power supply 36. According to this example, modem 14 may generate first and second power enable signals PWR_EN 1 and PWR_EN 2. The first power enable signal PWR_EN 1 controls a switch 34 associated with SIM power supply 30 to selectively supply and terminate power to SIM 16.

The second power enable signal PWR_EN 2 controls a switch 38 associated with SIM interface power supply 36 to selectively supply and terminate power to SIM interface circuit 32. In this manner, modem 14 can control power to SIM 16 and SIM interface circuit 32 independently of one another. In some cases, for example, it may be desirable to maintain power to SIM interface circuit 32 upon termination of power to SIM 16. In addition, as a practical matter, independent control may be necessary when SIM 16 and SIM interface circuit 32 have different power supplies.

Figure 4:
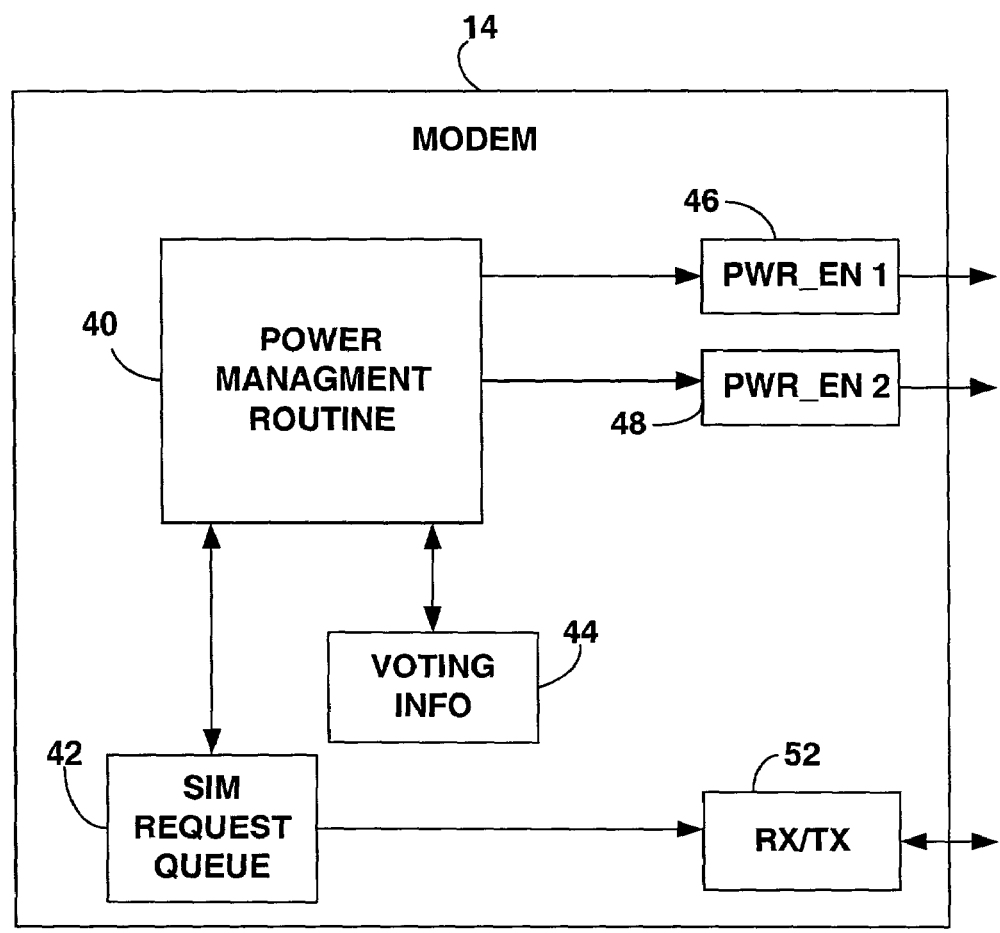
FIG. 4 is a block diagram illustrating a power management routine for a WCD that incorporates a SIM.

FIG. 4 is a functional block diagram illustrating a power management routine for a WCD that incorporates a SIM. In particular, FIG. 4 illustrates the operation of modem 14 in administering a voting process and managing power to a SIM. As shown in FIG. 4, a power management routine 40 executing in an operating environment provided by modem 14 may determine whether a SIM request queue 42 contains a pending request for service by SIM 16. As described below, various software modules executing within the operating environment provided by modem 14 may modify a set of voting information 44. In some embodiments, voting information 44 may take the form of a data structure, such as a bit mask, in which particular bits correspond to votes for difference software modules or processes. Modem 14 may assert a corresponding vote within voting information 44 in response to a user or air interface event that requires continuous power to SIM 16. The vote may be deasserted later, for example, when a command or request associated with the event has been served by SIM 16, unless the software module determines that another command or request is pending.

The request may be communicated to SIM 16 via an RX/TX section 52 in UART 24. In addition, power management routine 40 inspects voting bit information 44 to determine whether any of the processes running on WCD 10 have voted for maintenance of power to SIM 16. In the event a request is pending in SIM request queue 42 or a bit is asserted in the voting information bit mask 44, power management process 40 maintains power to SIM 16 and SIM interface 32 by continued assertion of PWR_EN 1 and PWR_EN2 signals 46, 48.

Figure 5:
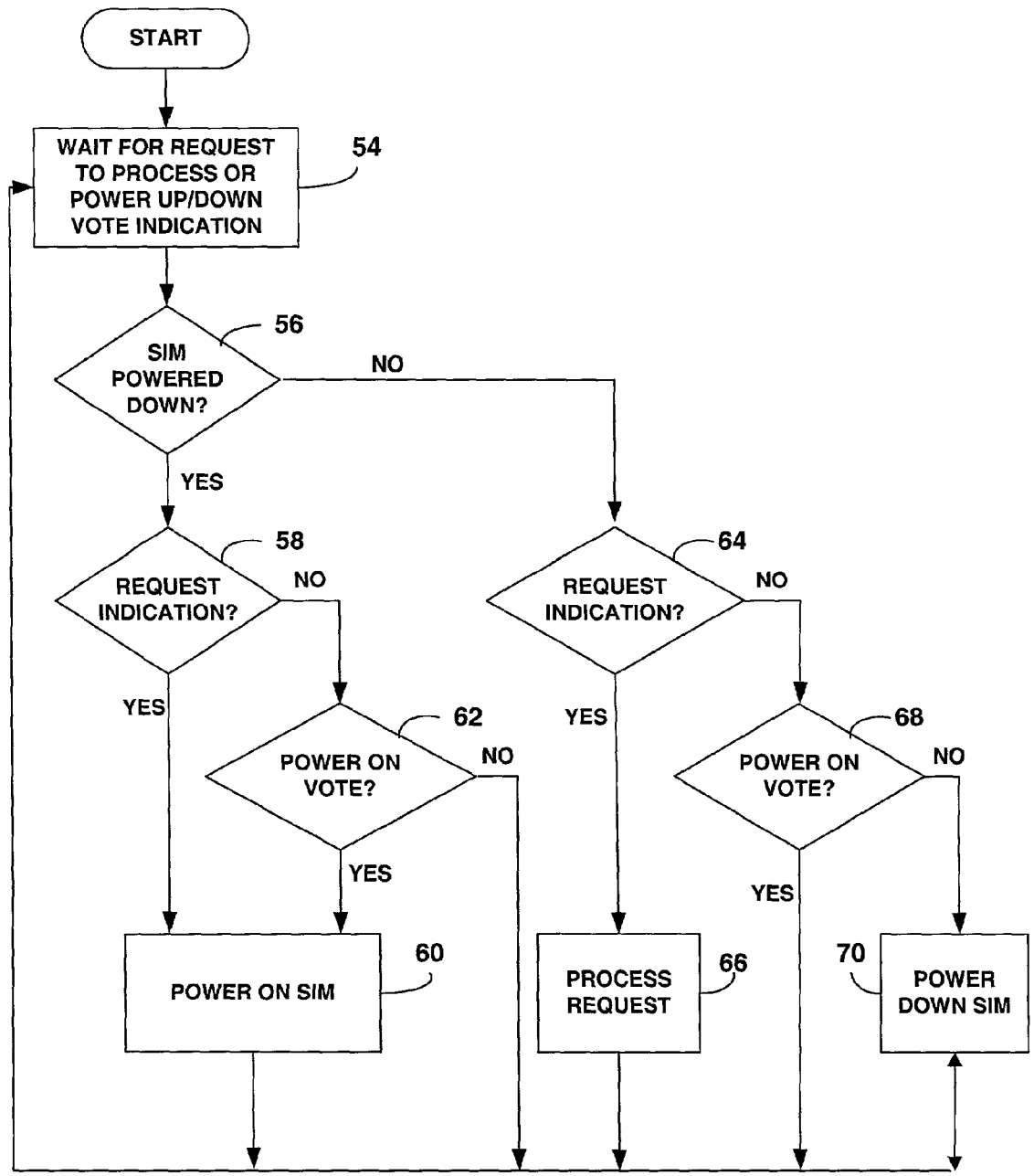
FIG. 5 is a flow diagram illustrating a power management routine for a WCD that incorporates a SIN.

FIG. 5 is a flow diagram illustrating a power management routine for a WCD 10 that incorporates a SIM 16. As shown in FIG. 5, the power management routine waits for either a request to process, or a power up/down vote indication (54). In other words, modem 14 refers to a request queue for SIM 16 to determine whether there are any pending requests, and administers a voting process to determine whether any processes have requested, directly or indirectly, maintenance of the supply of power to SIM 16.

In the event SIM 16 is already powered down (56), the routine determines whether a request is indicated, i.e., whether a software module has issued a command or other operation that must be processed (58), e.g., by reference to the SIM request queue. If a request is indicated, i.e., pending, the power management process powers on SIM 16 (60). If no request is indicated, the routine determines whether there is a power on vote (62) among any of the WCD software modules or processes that interact with SIM 16. If so, the process powers on SIM 16 (60). If not, the power management process returns to step 54.

If SIM 16 is not powered down (56), the power management process determines whether there is a request indication (64). If so, modem 14 passes the request to SIM 16 for processing in the ordinary course (66). If not, the power management process determines whether there is a power on vote (68). If there is no power on vote among the WCD software modules that interact with SIM 16, the power management process proceeds to power down SIM 16. Again, the power on vote may be represented by respective bits in a bit mask stored in memory on WCD 10. By consulting the voting information and the request queue, the power management process avoids powering down SIM when a request is pending or imminent, and thereby promotes better performance.

Figure 6:
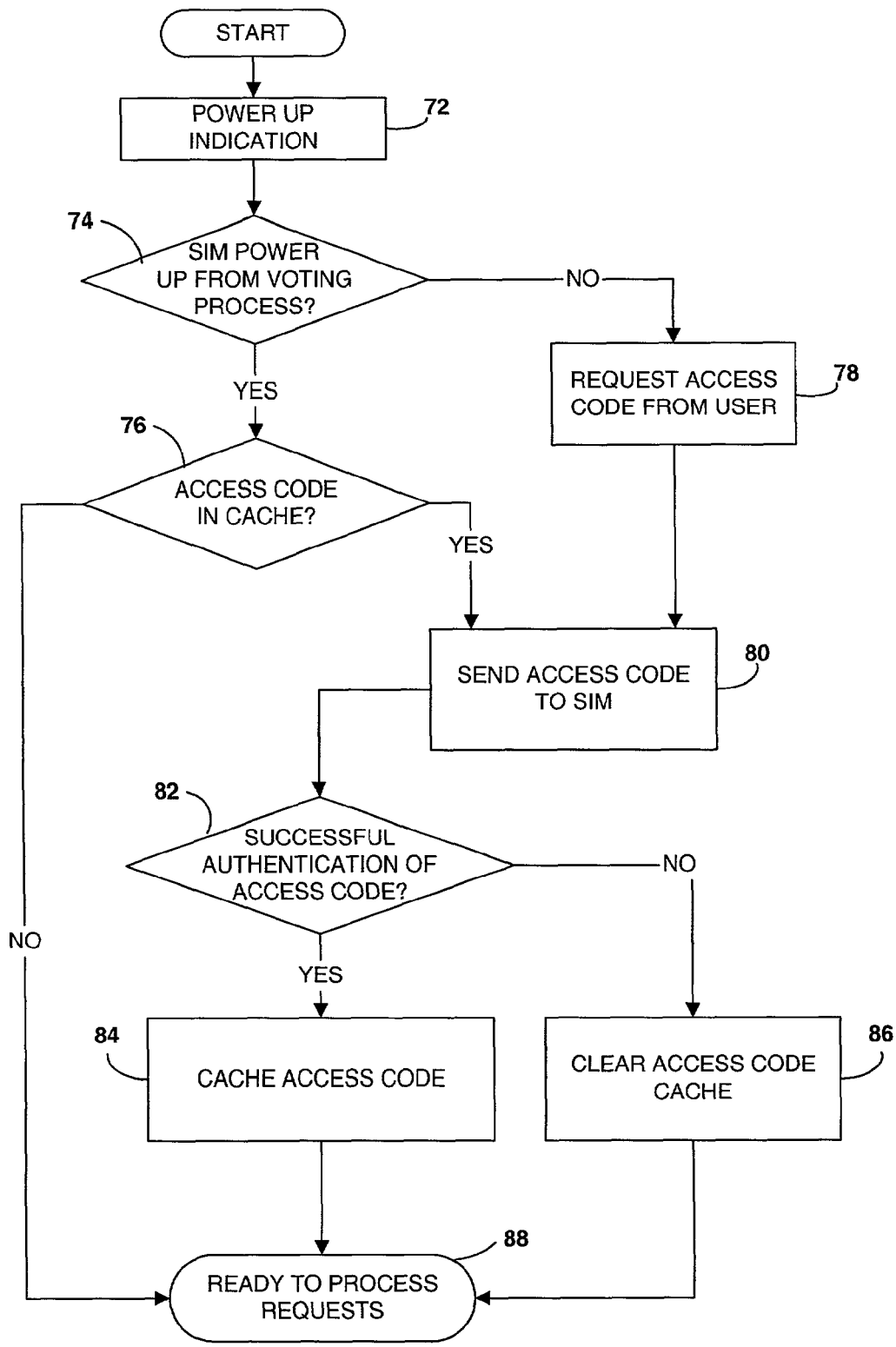
FIG. 6 is a flow diagram illustrating a security authorization process for a WCD that incorporates a SIM.

FIG. 6 is a flow diagram illustrating a modified security authorization process for a WCD 10 that incorporates a SIM 16 and provides a power management routine as described herein. Ordinarily, when WCD 10 is powered down, SIM 16 is also powered down. When WCD 10 is subsequently powered up, SIM 16 attempts to carry out a security authorization process in which an access code, such as a cardholder verification (CHV) code, is compared in the CPU of the SIM to a code entered by a user via a user interface such as a keypad associated with WCD 10.

When SIM 16 is powered down as a result of the power management routine described with reference to FIG. 5, the SIM attempts to carry out the same security authorization process. Because SIM 16 may be powered up and down many times during operation as part of the power management routine, entry of the access code by the user would be very inconvenient. Therefore, to promote user convenience, WCD 10 can be configured to store, or "cache," the access code in memory associated with the WCD.

When the access code is required upon power up following a power down executed by the power management routine, WCD 10 retrieves the cached access code from the memory and sends it to SIM 16 for use in the security authorization process to authorize use of the secure features of the SIM. In operation, WCD 10 stores the access code upon entry by the user and successful completion of the security authorization process.

As shown in FIG. 6, when there is a SIM power up indication (72), WCD 10 determines whether the power up resulted from the voting process associated with the power management routine (74). If so, WCD 10 determines whether the access code was cached by the WCD (76) upon the previous power down. Upon finding the cached access code, WCD 10 sends the access code to SIM 16 (80) for use in the security authorization process. Following successful authentication of the access code by SIM 16 (82), the access code is again cached by WCD 10 (84) for future use.

If the SIM power up is not the result of the voting process (74), WCD 10 requests the access code from the user (78), e.g., by prompting the user via a display and receiving the code via a keypad. Upon sending the access code to SIM (80), if authentication is not successfully completed, WCD 10 clears the access code cache (86). If there is no access code in the cache (76), the security authentication process is not completed. In each case, WCD 10 and SIM 16 are then ready to process requests (88). If authentication is not successfully completed, however, the secure operations of SIM 16 will not be performed successfully.

Instructions for causing a processor provided in WCD 10 or SIM 16, such as CPU 22 or CPU 26, to execute power management and security authorization processes as described herein may be stored on computer readable media. By way of example, and not limitation, computer readable media may comprise computer storage media and/or communication media. Computer storage media includes volatile and nonvolatile, removable and fixed media implemented in any method or technology for storage of information such as processor-readable instructions, data structures, program modules, or other data.

Computer storage media may include, but is not limited to, random access memory (RAM), read-only memory (ROM), EEPROM, flash memory, fixed or removable disc media, including optical or magnetic media, or any other medium that can be used to store the desired information and that can be accessed by a processor within WCD 10 of SIM 16. In particular, SIM 16 may carry on-board FLASH memory for storage of information and applications.

Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

Various embodiments of the invention have been described. These and other embodiments are within the scope of the following claims.

The invention claimed is:

1. A method for managing power to a subscriber identity module (SIM) in a wireless communication device (WCD) when power is supplied to the WCD during operation of the WCD, the method comprising:
   supplying power to the SIM when a request is pending for service by the SIM;
   supplying power to the SIM when a software module running on the WCD requests maintenance of power to the SIM; and
   terminating power to the SIM when no request is pending for service by the SIM and no software module running on the WCD requests maintenance of power to the SIM.

2. The method of claim 1, further comprising re-initiating supply of power to the SIM following termination of power to the SIM when a request from the WCD is pending for service by the SIM.

3. The method of claim 1, further comprising determining whether a request from the WCD is pending for service by the SIM based on inspection of a request queue associated with the SIM.

4. The method of claim 1, further comprising re-initiating supply of power to the SIM when a software module running on the WCD requests supply of power to the SIM.

5. The method of claim 4, further comprising determining whether a software module running on the WCD requests supply of power to the SIM based on polling of any of a plurality of software modules running on the WCD.

6. The method of claim 4, further comprising:
   asserting respective bits in a data structure when corresponding software modules running on the WCD request supply of power to the SIM;
   determining whether a software module running on the WCD requests supply of power to the SIM based on analysis of the data structure; and
   when any of the bits in the data structure is asserted, supplying power to the SIM.

7. The method of claim 1, wherein supplying power to the SIM includes maintaining power to the SIM.

8. The method of claim 1, wherein the SIM includes an interface circuit that interfaces with the WCD, and terminating power to the SIM includes terminating power to the interface circuit.

9. The method of claim 1, wherein the SIM includes a power supply line coupled to the WCD, and terminating power to the SIM includes terminating power to the power supply line.

10. The method of claim 1, wherein the SIM includes an interface circuit that interfaces with the WCD, the interface circuit including a clock input to the SIM, and wherein terminating power to the SIM includes terminating power after terminating a clock signal to the clock input.

11. The method of claim 1, further comprising:
   storing a user access code associated with the SIM in a memory associated with the WCD in response to a user entering the access code at an initial power up of the WCD;
   retrieving the user access code from the memory when power is supplied to the SIM following the termination of power to the SIM; and
   using the retrieved user access code in a security authorization process in the WCD to authorize use of secure features of the SIM.

12. The method of claim 11, wherein storing the user access code includes storing the user access code upon the termination of power to the SIM.

13. The method of claim 11, wherein the SIM is one of a removable user identification module (R-UIM) and a GSM SIM, and the user access code is a card holder verification (CHV) code.

14. The method of claim 11, wherein the SIM is a universal subscriber identification module (USIM), and the user access code is a personal identification number (PIN).

15. The method of claim 1, wherein the SIM is one of a removable user identification module (R-UIM), a GSM SIM, and a universal subscriber identification module (USIM).

16. The method of claim 1, wherein the WCD is one of a cellular radiotelephone, a satellite radiotelephone, a PCM-CIA card, and a PDA that communicates according to one of the CDMA standard, the GSM standard, and the WCDMA standard.

17. A system for managing power to a subscriber identity module (SIM) in a wireless communication device (WCD) when power is supplied to the WCD during operation of the WCD, the system comprising:
 a power source coupled to the SIM; and
 a processor that controls the power source to:
  (a) supply power from the power source to the SIM when a request from the WCD is pending for service by the SIM,
  (b) supply power from the power source to the SIM when a software module running on the WCD requests maintenance of power to the SIM, and
  (c) terminate power to the SIM when no request from the WCD is pending for service by the SIM and no software module running on the WCD requests supply of power to the SIM.

18. The system of claim 17, wherein the processor controls the power source to re-initiate supply of power to the SIM following termination of power to the SIM when a request from the WCD is pending for service by the SIM.

19. The system of claim 17, wherein the processor determines whether a request from the WCD is pending for service by the SIM based on inspection of a request queue associated with the SIM.

20. The system of claim 17, wherein the processor controls the power source to re-initiate supply of power to the SIM when a software module running on the WCD requests supply of power to the SIM.

21. The system of claim 20, wherein the processor determines whether a software module running on the WCD requests supply of power to the SIM based on polling of any of a plurality of software modules running on the WCD.

22. The system of claim 20, further comprising a memory storing a data structure with bits corresponding to software modules running on the WCD, wherein the processor asserts respective bits in the data structure when corresponding software modules running on the WCD request supply of power to the SIM, determines whether a software module running on the WCD requests supply of power to the SIM based on analysis of the data structure, and, when any of the bits in the data structure is asserted, controls the power source to supply power to the SIM.

23. The system of claim 17, wherein the processor controls the power source to maintain power to the SIM.

24. The system of claim 17, wherein the SIM includes an interface circuit that interfaces with the WCD, and the processor controls the power source to terminate power to the SIM by terminating power to the interface circuit.

25. The system of claim 17, wherein the SIM includes a power supply line coupled to the WCD, and the processor controls the power source to terminate power to the SIM by terminating power to the power supply line.

26. The system of claim 17, wherein the SIM includes an interface circuit that interfaces with the WCD, the interface circuit including a clock input to the SIM, and wherein the processor controls the power source to terminate power to the SIM by terminating power after terminating a clock signal to the clock input.

27. The system of claim 17, further comprising a memory associated with the WCD that stores a user access code associated with the SIM in response to a user entering the access code at an initial power up of the WCD, wherein the processor retrieves the user access code from the memory when power is supplied to the SIM following the termination of power to the SIM, and uses the retrieved user access code in a security authorization process in the WCD to authorize use of the secure features SIM.

28. The system of claim 27, wherein the processor stores the user access code upon the termination of power to the SIM.

29. The system of claim 27, wherein the SIM is one of a removable user identification module (R-UIM) and a GSM SIM, and the user access code is a card holder verification (CHV) code.

30. The system of claim 27, wherein the SIM is a universal subscriber identification module (USIM), and the user access code is a personal identification number (PIN).

31. The system of claim 17, wherein the SIM is one of a removable user identification module (R-UIM), a GSM SIM, and a universal subscriber identification module (USIM).

32. The system of claim 17, wherein the WCD is one of a cellular radiotelephone, a satellite radiotelephone, a PCM-CIA card, and a PDA that communicates according to one of the CDMA standard, the GSM standard, and the WCDMA standard.

33. A computer-readable medium containing instructions that cause a programmable processor to manage power to a subscriber identity module (SIM) of a wireless communication device (WCD) when power is supplied to the WCD during operation of the WCD:
 supply power to the SIM when a request from the WCD is pending for service by the SIM;
 supply power to the SIM when a software module running on the WCD requests maintenance of power to the SIM; and
 terminate power to the SIM when no request from the WCD is pending for service by the SIM and no software module running on the WCD requests supply of power to the SIM.

34. The computer-readable medium of claim 33, wherein the instructions cause the processor to re-initiate supply of power to the SIM following termination of power to the SIM when a request from the WCD is pending for service by the SIM.

35. The computer-readable medium of claim 33, wherein the instructions cause the processor to determine whether a request from the WCD is pending for service by the SIM based on inspection of a request queue associated with the SIM.

36. The computer-readable medium of claim 33, wherein the instructions cause the processor to re-initiate supply of power to the SIM when a software module running on the WCD requests supply of power to the SIM.

37. The computer-readable medium of claim 36, wherein the instructions cause the processor to determine whether a software module running on the WCD requests supply of power to the SIM based on polling of any of a plurality of software modules running on the WCD.

38. The computer-readable medium of claim 36, wherein the instructions cause the processor to:
 define a data structure with bits corresponding to software modules running on the WCD;
 assert respective bits in the data structure when corresponding software modules running on the WCD request supply of power to the SIM;

determine whether a software module running on the WCD requests supply of power to the SIM based on analysis of the data structure; and when any of the bits in the data structure is asserted, supply power to the SIM.

39. The computer-readable medium of claim 37, wherein the instructions cause the processor to supply power to the SIM by maintaining power to the SIM.

40. The computer-readable medium of claim 33, wherein the SIM includes an interface circuit that interfaces with the WCD, and the instructions cause the processor to terminate power to the SIM by terminating power to the interface circuit.

41. The computer-readable medium of claim 33, wherein the SIM includes a power supply line coupled to the WCD, and the instructions cause the processor to terminate power to the SIM by terminating power to the power supply line.

42. The computer-readable medium of claim 33, wherein the SIM includes an interface circuit that interfaces with the WCD, the interface circuit including a clock input to the SIM , and the instructions cause the processor to terminate power to the SIM by terminating power after terminating a clock signal to the clock input.

43. The computer-readable medium of claim 33, wherein the instructions cause the processor to:

store a user access code associated with the SIM in a memory associated with the WCD in response to a user entering the access code at an initial power up of the WCD;

retrieve the user access code from the memory when power is supplied to the SIM following the termination of power to the SIM; and use the retrieved user access code in a security authorization process in the WCD to authorize use of the WCD.

44. The computer-readable medium of claim 43, wherein the instructions cause the processor to store the user access code upon the termination of power to the SIM.

45. The computer-readable medium of claim 43, wherein the SIM is one of a removable user identification module (R-UIM) and a GSM SIM, and the user access code is a card holder verification (CHV) code.

46. The computer-readable medium of claim 43, wherein the SIM is a universal subscriber identification module (USIM), and the user access code is a personal identification number (PIN).

47. The computer-readable medium of claim 33, wherein the SIM is one of a removable user identification module (R-UIM), a GSM SIM, and a universal subscriber identification module (USIM).

48. The computer-readable medium of claim 33, wherein the WCD is one of a cellular radiotelephone, a satellite radiotelephone, a PCMCIA card, and a PDA that communicates according to one of the CDMA standard, the GSM standard, and the WCDMA standard.

49. A method comprising:

storing a user access code associated with a subscriber identity module (SIM) in a memory associated with a wireless communication device (WCD) in response to a user entering the access code at an initial power up of the WCD;

retrieving the user access code from the memory when power is resupplied to the SIM;

using the retrieved user access code in a security authorization process in the WCD to authorize use of secure features of the SIM;

terminating power to the SIM when no request from the WCD is pending for service by the SIM and no software module running on the WCD requests supply of power to the SIM;

terminating power to the SIM when power to the WCD is terminated retrieving and using the user access code when power is resupplied to the SIM following termination of power to the SIM when no request from the WCD is pending for service by the SIM and no software module running on the WCD requests supply of power to the SIM; and accepting and using user input as the user access code when power is resupplied to the SIM following termination when power to the WCD is terminated.

50. The method of claim 49, wherein storing the user access code includes storing the user access code when power to the SIM is terminated.

51. The method of claim 49, wherein the SIM is one of a removable user identification module (R-UIM) and a GSM SIM, and the user access code is a card holder verification (CHV) code.

52. The method of claim 49, wherein the SIM is a universal subscriber identification module (USIM), and the user access code is a personal identification number (PIN).

53. The method of claim 49, wherein the SIM is one of a removable user identification module (R-UIM), a GSM SIM, and a universal subscriber identification module (USIM).

54. The method of claim 49, wherein the WCD is one of a cellular radiotelephone, a satellite radiotelephone, a PCMCIA card, and a PDA that communicates according to one of the CDMA standard, the GSM standard, and the WCDMA standard.

55. A system comprising:

a memory that stores a user access code associated with a subscriber identity module (SIM) in a memory associated with a wireless communication device (WCD) in response to a user entering the access code at an initial power up of the WCD; and a processor that retrieves the user access code from the memory when power is resupplied to the SIM, uses the retrieved user access code in a security authorization process in the WCD to authorize use of the WCD, terminates power to the SIM when no request from the WCD is pending for service by the SIM and no software module running on the WCD requests supply of power to the SIM, terminates power to the SIM when power to the WCD is terminated, retrieves and uses the user access code when power is resupplied to the SIM following termination of power to the SIM when no request from the WCD is pending for service by the SIM and no software module running on the WCD requests supply of power to the SIM, and accepts and uses user input as the user access code when power is resupplied to the SIM following termination of power to the SIM when power to the WCD is terminated.

56. The system of claim 55, wherein the processor stores the user access code in the memory when power to the SIM is terminated.

57. The system of claim 55, wherein the SIM is one of a removable user identification module (R-UIM) and a GSM SIM, and the user access code is a card holder verification (CHV) code.

58. The system of claim 55, wherein the SIM is a universal subscriber identification module (USIM), and the user access code is a personal identification number (PIN).

59. The system of claim 55, wherein the SIM is one of a removable user identification module (R-UIM), a GSM SIM, and a universal subscriber identification module (USIM).

60. The system of claim 55, wherein the WCD is one of a cellular radiotelephone, a satellite radiotelephone, a PCMCIA card, and a PDA that communicates according to one of the CDMA standard, the GSM standard, and the WCDMA standard.

61. A computer-readable medium containing instructions that cause a processor to:
store a user access code associated with a SIM in a memory associated with a wireless communication device (WCD) in response to a user entering the access code at an initial power up of the WCD;
retrieve the user access code from the memory when power is resupplied to the SIM;
use the retrieved user access code in a security authorization process in the WCD to authorize use of the WCD;
terminate power to the SIM when no request from the WCD is pending for service by the SIM and no software module running on the WCD requests supply of power to the SIM;
terminate power to the SIM when power to the WCD is terminated;
retrieve and use the user access code when power is resupplied to the SIM following termination of power to the SIM when no request from the WCD is pending for service by the SIM and no software module running on the WCD requests supply of power to the SIM; and
accept and use user input as the user access code when power is resupplied to the SIM following termination of power to the SIM when power to the WCD is terminated.

62. The computer-readable medium of claim 61, wherein the instructions cause the processor to store the user access code when power to the SIM is terminated.

63. The computer-readable medium of claim 61, wherein the SIM is one of a removable user identification module (R-UIM) and a GSM SIM, and the user access code is a card holder verification (CHV) code.

64. The computer-readable medium of claim 61, wherein the SIM is a universal subscriber identification module (USIM), and the user access code is a personal identification number (PIN).

65. The computer-readable medium of claim 61, wherein the SIM is one of a removable user identification module (R-UIM), a GSM SIM, and a universal subscriber identification module (USIM).

66. The computer-readable medium of claim 61, wherein the WCD is one of a cellular radiotelephone, a satellite radiotelephone, a PCMCIA card, and a PDA that communicates according to one of the CDMA standard, the GSM standard, and the WCDMA standard.

67. The computer-readable medium of claim 61, wherein the user access code enables access to secure features of the SIM.

68. A wireless communication device (WCD) including a subscriber identity module (SIM) and means for managing power to the SIM when power is supplied to the WCD during operation of the WCD, the WCD comprising:
means for supplying power to the SIM when a request is pending for service by the SIM;
means for supplying power to the SIM when a software module running on the WCD requests maintenance of power to the SIM; and
means for terminating power to the SIM when no request is pending for service by the SIM and no software module running on the WCD requests maintenance of power to the SIM.

69. The WCD of claim 68, further comprising means for re-initiating supply of power to the SIM following termination of power to the SIM when a request from the WCD is pending for service by the SIM.

70. The WCD of claim 68, further comprising means for determining whether a request from the WCD is pending for service by the SIM based on inspection of a request queue associated with the SIM.

71. The WCD of claim 68, further comprising means for re-initiating supply of power to the SIM when a software module running on the WCD requests supply of power to the SIM.

72. The WCD of claim 71, further comprising means for determining whether a software module running on the WCD requests supply of power to the SIM based on polling of any of a plurality of software modules running on the WCD.

73. The WCD of claim 71, further comprising:
means for asserting respective bits in a data structure when corresponding software modules running on the WCD request supply of power to the SIM;
means for determining whether a software module running on the WCD requests supply of power to the SIM based on analysis of the data structure; and
means for supplying power to the SIM when any of the bits in the data structure is asserted.

74. The WCD of claim 68, wherein the means for supplying power to the SIM includes means for maintaining power to the SIM.

75. The WCD of claim 68, wherein the SIM includes an interface circuit that interfaces with the WCD, and the means for terminating power to the SIM includes means for terminating power to the interface circuit.

76. The WCD of claim 68, wherein the SIM includes a power supply line coupled to the WCD, and the means for terminating power to the SIM includes means for terminating power to the power supply line.

77. The WCD of claim 68, wherein the SIM includes an interface circuit that interfaces with the WCD, the interface circuit including a clock input to the SIM, and wherein means for terminating power to the SIM includes means for terminating power after terminating a clock signal to the clock input.

78. The WCD of claim 68, further comprising:
means for storing a user access code associated with the SIM in a memory associated with the WCD in response to a user entering the access code at an initial power up of the WCD;
means for retrieving the user access code from the memory when power is supplied to the SIM following the termination of power to the SIM; and
means for using the retrieved user access code in a security authorization process in the WCD to authorize use of secure features of the SIM.

79. The WCD of claim 78, wherein the means for storing the user access code stores the user access code upon the termination of power to the SIM.

80. The WCD of claim 78, wherein the SIM is one of a removable user identification module (R-UIM) and a GSM SIM, and the user access code is a card holder verification (CHV) code.

81. The WCD of claim 78, wherein the SIM is a universal subscriber identification module (USIM), and the user access code is a personal identification number (PIN).

82. The WCD of claim 68, wherein the SIM is one of a removable user identification module (R-UIM), a GSM SIM, and a universal subscriber identification module (USIM).

83. The WCD of claim 68, wherein the WCD is one of a cellular radiotelephone, a satellite radiotelephone, a PCM-CIA card, and a PDA that communicates according to one of the CDMA standard, the GSM standard, and the WCDMA standard.

84. A wireless communication device (WCD) including a subscriber identity module (SIM), wherein the WCD manages power to the SIM when power is supplied to the WCD during operation of the WCD, the WCD comprising:
  a power source coupled to the SIM; and
  a processor that controls the power source to:
    (a) supply power from the power source to the SIM when a request from the WCD is pending for service by the SIM,
    (b) supply power from the power source to the SIM when a software module running on the WCD requests maintenance of power to the SIM, and
    (c) terminate power to the SIM when no request from the WCD is pending for service by the SIM and no software module running on the WCD requests supply of power to the SIM.

85. The WCD of claim 84, wherein the processor controls the power source to re-initiate supply of power to the SIM following termination of power to the SIM when a request from the WCD is pending for service by the SIM.

86. The WCD of claim 84, wherein the processor determines whether a request from the WCD is pending for service by the SIM based on inspection of a request queue associated with the SIM.

87. The WCD of claim 84, wherein the processor controls the power source to re-initiate supply of power to the SIM when a software module running on the WCD requests supply of power to the SIM.

88. The WCD of claim 87, wherein the processor determines whether a software module running on the WCD requests supply of power to the SIM based on polling of any of a plurality of software modules running on the WCD.

89. The WCD of claim 87, further comprising a memory storing a data structure with bits corresponding to software modules running on the WCD, wherein the processor asserts respective bits in the data structure when corresponding software modules running on the WCD request supply of power to the SIM, determines whether a software module running on the WCD requests supply of power to the SIM based on analysis of the data structure and, when any of the bits in the data structure is asserted, controls the power source to supply power to the SIM.

90. The WCD of claim 84, wherein the processor controls the power source to maintain power to the SIM.

91. The WCD of claim 84, wherein the SIM includes an interface circuit that interfaces with the WCD, and the processor controls the power source to terminate power to the SIM by terminating power to the interface circuit.

92. The WCD of claim 84, wherein the SIM includes a power supply line coupled to the WCD, and the processor controls the power source to terminate power to the SIM by terminating power to the power supply line.

93. The WCD of claim 84, wherein the SIM includes an interface circuit that interfaces with the WCD, the interface circuit including a clock input to the SIM, and wherein the processor controls the power source to terminate power to the SIM by terminating power after terminating a clock signal to the clock input.

94. The WCD of claim 84, further comprising a memory that stores a user access code associated with the SIM in response to a user entering the access code at an initial power up of the WCD, wherein the processor retrieves the user access code from the memory when power is supplied to the SIM following the termination of power to the SIM, and uses the retrieved user access code in a security authorization process in the WCD to authorize use of the secure features SIM.

95. The WCD of claim 94, wherein the processor stores the user access code upon the termination of power to the SIM.

96. The WCD of claim 94, wherein the SIM is one of a removable user identification module (R-UIM) and a GSM SIM, and the user access code is a card holder verification (CHV) code.

97. The WCD of claim 94, wherein the SIM is a universal subscriber identification module (USIM), and the user access code is a personal identification number (PIN).

98. The WCD of claim 84, wherein the SIM is one of a removable user identification module (R-UIM), a GSM SIM, and a universal subscriber identification module (USIM).

99. The WCD of claim 84, wherein the WCD is one of a cellular radiotelephone, a satellite radiotelephone, a PCM-CIA card, and a PDA that communicates according to one of the CDMA standard, the GSM standard, and the WCDMA standard.

* * * * *